UNITED STATES PATENT OFFICE.

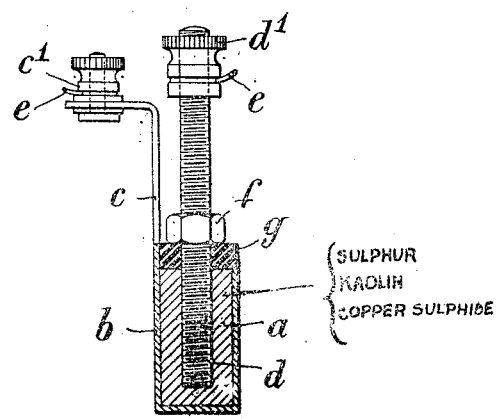

PIERRE FERRA, OF CALUIRE-ET-CUIRE, NEAR LYON, FRANCE.

THERMOPILE.

1,127,424.

Specification of Letters Patent.

Patented Feb. 9, 1915.

Application filed June 10, 1912. Serial No. 702,882.

*To all whom it may concern:*

Be it known that I, PIERRE FERRA, a citizen of the Republic of France, residing at Caluire-et-Cuire, near Lyon, France, have invented a new and useful Thermopile, of which the following is a specification.

This invention relates to a new compound having a high thermal resistance and a low electric resistance. By reason of such physical qualities the compound is of utility for the manufacture of thermo-electric elements, and in its use for this purpose electric current is produced with efficiency by the application of heat.

The compound is also of advantage for use as an insulating material of heat or cold.

It is known to employ metallic sulfids and especially copper sulfid for molding and insulating purposes and they have also been proposed in conjunction with sulfur for the manufacture of thermo-electric elements; also an acid resisting composition of pyrites sulfur and sand has been proposed.

The invention has for its object to produce a thermopile in which one of the materials of the couple is a compound having a metallic sulfid and especially copper sulfid cuprous or cupric as its base and that is homogenous that has a substantially constant electro-motive force and that yields high efficiency in the development of electric current by the application of heat and which has an electric resistance diminishing instead of increasing with the increase of temperature.

I have found that by the addition of kaolin or of a substance having some of the characteristics of kaolin to a metallic sulfid and especially to copper sulfid, to which a quantity of sulfur is also added, a compound is produced that under practical conditions possesses a high degree of thermal resistance and a very low electric resistance.

The said invention comprises a thermo-electric couple or pile in which one of the members of the couple or pile is composed of a composite material consisting of a metallic sulfid with sulfur and a substance having the characteristics of kaolin as described and claimed in my application Serial No. 662,487, filed November 25th, 1911, which eventuated into Patent No. 1,075,773 of October 14, 1913, of which this is a continuation in part.

The accompanying drawing shows diagrammatically, how my said invention may be conveniently and advantageously carried into practice. This drawing shows a thermo-electric element comprising a filling $a$ of the composite material above mentioned, within a brass receptacle or cell $b$ to which one terminal of the circuit wire $c$ is attached. The other terminal $e$ is attached to a metal rod $d$, for example, of brass, in contact with or embedded in the composite material. When the cell is heated exteriorly the hot junction is between the cell $b$ and the filling $a$ while, by reason of the high heat insulating properties of the filling, the cold junction is between the filling $a$ and the rod $d$. The cell $b$ is hermetically closed by a rod $g$ of insulating material such as asbestos.

The filling material is preferably produced by first melting the substances specified and cooling the liquid mass produced, crushing the product, and reducing it into the condition of fine powder. This fine powder is then compressed under pressure in molds or in envelops or casings, which conveniently may take the form of tubes, rectangular cases, etc. By such treatment a homogenous, hard and refractory substance is produced, and when the mixture is compressed into envelops or casings complete contact of the substance with the envelops or casings results. After compression the compound is heated to about 800° C. which has to be done in a closed vessel and by which it is further indurated and rendered ready for use.

In carrying the process into effect, by way of example I take 25 to 30 parts of sulfur with about from 1 to 2 parts of kaolin and I melt the mixture of sulfur and kaolin with about 78 to 80 parts of copper sulfid in a covered crucible until about 20% or parts of sulfur remains, I then allow the molten mass to cool. I then reduce it to the condition of fine powder and subject it to pressure as described.

A bar of this compound, if heated at one end, will generate an electric current from the hotter to the colder end; and a battery or generator may be readily formed from a number of such bars or generator elements or units connected together in parallel or in series and heat applied at one part or extremity thereof or over the whole surface, and in such an application the compound may take any suitable form, and heat or cold may be applied to the compound in the bar or in any other form in any particular way desired.

In the use of the compound for the manufacture of elements for thermo-electric generators or other purposes in which the compound is subject to great heat or variation of temperature I retain the compound within an hermetically closed casing so as to avoid the possibility of its oxidation and disintegration. When providing elements for thermo-electric generators I form the casing of brass completely and hermetically to incase the compound, the casing thus serving as one pole of the element. I use brass for this purpose as this metal has substantially the same co-efficient of expansion as the compound.

In the manufacture of the compound, instead of kaolin, quartz in a fine condition, sand, clay, or any other substance having the characteristics of kaolin may be employed, while cupric sulfid may be substituted in some cases for the cuprous sulfid which I prefer.

I claim:

1. A thermopile comprising a metal cell, a packing of composite material consisting of a metallic sulfid with sulfur and a substance having the characteristics of kaolin, and an electric conductor between the cell and the composite material exterior thereto.

2. A thermopile comprising a metal cell, a packing of a composite material consisting of a metallic sulfid with sulfur and a substance having the characteristics of kaolin, the said ingredients of the composite material being first melted together, cooled to solidification, reduced to a fine powder and packed tightly in the said cell, and an electric conductor between the cell and the composite material exterior thereto.

3. A thermopile comprising a brass cell, a packing of composite material consisting of a metallic sulfid with sulfur and a substance having the characteristics of kaolin, and an electric conductor between the cell and the composite material exterior thereto.

4. A thermopile comprising a metal cell adapted to be heated exteriorly, a packing of a composite material consisting of a metallic sulfid with sulfur and a substance having the characteristics of kaolin, and a conductor of electricity leading from the said cell to a part of the composite material not in contact with the material of the said cell.

5. A thermopile comprising a metal cell, adapted to be heated exteriorly, a packing of a composite material, consisting of a metallic sulfid with sulfur and a substance having the characteristics of kaolin, the said ingredients of the composite material being first melted together, cooled to solidification, reduced to a fine powder and packed tightly in said cell, and a conductor of electricity leading from the said cell to a part of the composite material not in contact with the material of the said cell.

PIERRE FERRA.

Witnesses:
EDOUARD JUVANORT,
FRANÇOIS DUBAST.